United States Patent
Havran et al.

(10) Patent No.: US 10,764,482 B2
(45) Date of Patent: Sep. 1, 2020

(54) PORTABLE DEVICE FOR MEASURING THE GEOMETRY OF AN OBJECT AND ITS SPATIALLY VARYING SURFACE REFLECTANCE ON SITE

(71) Applicant: CESKE VYSOKE UCENI TECHNICKE V PRAZE, Prague-Dejvice (CZ)

(72) Inventors: Vlastimil Havran, Prague (CZ); Jan Hosek, Ricany (CZ); Jiri Bittner, Prague (CZ); Sarka Nemcova, Prague (CZ); Jiri Cap, Prague (CZ)

(73) Assignee: CESKE VYSOKE UCENI TECHNICKE V PRAZE JUGOSLAVSKYCH PARTYZANU, Prague (CZ)

( * ) Notice: Subject to any disclaimer, the term of this patent is extended or adjusted under 35 U.S.C. 154(b) by 0 days.

(21) Appl. No.: 16/465,165

(22) PCT Filed: Nov. 29, 2017

(86) PCT No.: PCT/CZ2017/050059
§ 371 (c)(1),
(2) Date: May 30, 2019

(87) PCT Pub. No.: WO2018/099498
PCT Pub. Date: Jun. 7, 2018

(65) Prior Publication Data
US 2019/0342478 A1  Nov. 7, 2019

(30) Foreign Application Priority Data
Nov. 30, 2016  (CZ) .................................. 2016-752

(51) Int. Cl.
*G01N 21/47* (2006.01)
*H04N 5/225* (2006.01)
*G06T 15/10* (2011.01)

(52) U.S. Cl.
CPC ......... *H04N 5/2256* (2013.01); *G01N 21/474* (2013.01); *G06T 15/10* (2013.01);
(Continued)

(58) Field of Classification Search
CPC ............... H04N 5/2256; G01N 21/474; G01N 2021/4711; G01N 2021/4735; G01N 2021/4783; G01N 2201/0221; G06T 15/10
See application file for complete search history.

(56) References Cited

U.S. PATENT DOCUMENTS

2009/0079987 A1  3/2009  Ben-Ezra et al.
2016/0171748 A1*  6/2016  Kohlbrenner ........... G06T 15/10
                                                              348/48
(Continued)

FOREIGN PATENT DOCUMENTS

WO          9633401 A1    10/1996

OTHER PUBLICATIONS

International Search Report (dated Mar. 8, 2018) for corresponding International App. PCT/CZ2017/050059.

(Continued)

*Primary Examiner* — Mekonnen D Dagnew
(74) *Attorney, Agent, or Firm* — WRB-IP LLP

(57) ABSTRACT

The invention concerns a portable device that, even for a device of small dimensions, increases the amount of the recorded imagery data of a measured object in a fixed position in order to obtain spatially varying surface reflectance data, i.e. Bidirectional Texture Function data, and the multidirectional imaging of real objects with the use of a basic three-dimensional object (2) equipped with first illu-
(Continued)

mination units (4) and/or exit apertures of a light guiding system (21) in combination with multiplication of optical elements (11) contributing to the imaging on the acquisition system and/or second illumination units (9) and/or acquisition elements of the camera/detector type and/or third illumination units (12), by their placement on moveable arms (7, 8, 13) attached to the basic three-dimensional object (2). This principle is usable for small portable devices and allows for recording the visual appearance of surfaces on site without having to extract a sample from its environment.

12 Claims, 4 Drawing Sheets

(52) U.S. Cl.
CPC ............... *G01N 2021/4711* (2013.01); *G01N 2021/4735* (2013.01)

(56) References Cited

U.S. PATENT DOCUMENTS

| 2016/0360184 | A1* | 12/2016 | Tausch | G01B 11/245 |
| 2018/0247393 | A1* | 8/2018 | Ohga | G06T 5/006 |
| 2018/0262750 | A1* | 9/2018 | Choi | H04N 13/254 |

* cited by examiner

PORTABLE DEVICE FOR MEASURING THE GEOMETRY OF AN OBJECT AND ITS SPATIALLY VARYING SURFACE REFLECTANCE ON SITE

TECHNICAL FIELD

The submitted technical design of the device and its measurement principle can be classified to the area of technical optics—the use of the contactless optical imaging of a sample with applications in the digital industry, computer vision, the control of material quality and in all areas where it is necessary to characterise the appearance of a material, for example when preserving cultural heritage artefacts. Using an optical record and the reconstruction of data from various types of samples it is possible to create a representation of a real object in 3D virtual reality.

BACKGROUND OF THE INVENTION

The appearance of the surface of objects in the real world is traditionally perceived through images that differ depending on the direction of observation, the direction of the illumination and the spectral and spatial distribution of the light over the surface of the object given by the resolution of the used optical systems, including the human eye. The goal of computer graphics is the creation of a virtual world, in which the same appearance of the object is achieved as it is perceived in the real world. In virtual reality, the world is presented as 3D objects covered with a suitable representation of their surface appearance. One of the methods used to achieve the high fidelity of the appearance of the surface structure is the bidirectional texture function (BTF) method. This method was introduced by the author K. J. Dana and collective in the publication "*Reflectance and Texture of Real-world Surfaces*", published in the year 1999 by *ACM Transactions on Graphics*, in volume 18, issue 1, pp 1-34. The appearance of the object's surface here is represented by a group of thousands of images taken for various combinations of illumination and acquisition directions. The acquisition of BTF data is typically a time-demanding process and lasts up to several hours or even days depending on the chosen directional, spatial and spectral resolution of the individual BTF images.

The problem of obtaining a sufficient number of images with various combinations of the directions of illumination of the sample and the directions of data acquisition from the sample in the shortest possible time is resolved in various ways elsewhere in the world. There is, for example, a stationary device that deals with the problem of shortening the time required to acquire a sufficient number of images of the sample by using multiple sources of illumination of the sample or detectors acquiring the images of the sample, as shown in the publication by G. Müller and collective "*Rapid synchronous acquisition of geometry and BTF for cultural heritage artefacts*," published in 2005 in the volume of the 6th International Symposium on Virtual Reality, Archaeology and Cultural Heritage (VAST) on pages 13-20, or in the publication by C. Schwartz and collective "*Design and Implementation of Practical Bidirectional Texture Function Measurement Devices Focusing on the Developments at the University of Bonn*," published in 2014 in *Sensors* magazine, volume 14, issue 5, pp 7753-7819. Such devices, however, are stationary and bulky in order to ensure the mechanical stability of their entire construction. Furthermore, for such devices there is only a finite number of obtainable combinations of directions of illumination of the sample and directions of data acquisition from the sample due to the fixed positions of the light sources and detectors. For devices with a fixed grid of light sources and image sensors, the minimum difference of mutual directions of illumination of the sample and/or directions of the data acquisition from the sample is given by the size of the individual sources of illumination or image sensors so that they can be placed next to each other on a sphere, and the angular resolution of the directions can only be increased by increasing the radius of the sphere on which the sources and sensors are placed. This significantly limits the achieved angular resolution of the combinations of illumination and data acquisition directions for the construction of small, i.e. portable instruments for BTF measurements, for which a low weight is important from a utility perspective. Another design possibility involves moving the sample, as is mentioned in the publication of C. Schwartz and collective "*Dome II: A Parallelized BTF Acquisition System*", published in June 2013 for the Eurographics Workshop on Material Appearance Modelling: Issues and Acquisition. Such a method is totally unsuitable for the implementation of portable devices for taking measurements in the field, where the sample is integrated into its environment and its extraction would lead to a breach of the placement of the sample.

There are also smaller devices, as presented, for example, in the publication by the authors Y. J. Han and K. Perlin, "*Measuring bidirectional texture reflectance with a kaleidoscope*," published in 2003 in the magazine *ACM Transactions on Graphics*, issue 22 (3), pp 741-748, or in the publication by J. Filip and collective "*Rapid material appearance acquisition using consumer hardware*," published in 2014 in the magazine *Sensors*, issue 14(10), pp 19785-19805. Nevertheless, these solutions generally have rather limited spatial resolutions of the acquired images and a small number of combinations of illumination and acquisition directions. The overall measurements, without the possibility of using the multiple acquisition of images, takes a very long time or, in the case of optical multiplication without the movement of individual parts of the device, only a small limited number of measurement directions is achieved.

Recently, in 2015, an article by the authors J. Hošek, V. Havran and collective, "*Realisation of Circular Motion for Portable BTF Measurement Instrument*," was published in the magazine *The Romanian Review Precision Mechanics, Optics & Mechatronics*, issue 48, on pages 252-255, which equipped a spherical surface with LED diodes with an independently movable arm with several cameras. This made it possible to make the size of the instrument smaller thanks to the movability of the arm with the cameras, though the size of the device is still limited by the size of the cameras. The combinations of the directions of illumination, which comes from the light sources affixed to the spherical surface, and the imaging directions in this device are still quite limited, especially with the smaller dimensions of the overall device, which makes it possible to place only a small number of cameras on the arm. This then decreases the achieved angular resolution of combinations of illumination directions of the sample and the directions of data acquisition from the sample.

A glossmeter is known from the document WO 96/33401 A1 to YISUM RES DEV CO (IL), by RAPAPORT ERICH (IL), NUSSINOVITCH AMOS (IL). However, this glossmeter does not allow to minimize the size of the device, namely of the arch supporting the photodetectors, and requires the sample extraction from its environment. To achieve a sufficient number of combinations of illumination and acquisition direction, it is necessary to put the sample on a rotating plate.

US patent application US 2016/171748 A1 by KOIHL-BRENNER ADRIAN (CH) ET AL, discloses a method and an apparition for digitizing the appearance of real material. Again, this invention requires the sample extraction from its environment, as the sample must be mounted on a rotating support.

US patent application US 2009/079987 by BEN-EZRA MOSHE ET AL describes a photodiode-based BRDF measurement. It includes a dome-like object with LED units to illuminate the sample. It allows in principle measurement of a sample without the sample extraction from its environment, as in our invention. Due to the use of LEDs only the device does not allow to measure spatially varying surface reflectance of a planar sample, as it measures reflectance for only a single point, known as BRDF. Replacing the LEDs by cameras with light sources would result in a device in the publication by C. Schwartz and collective "*Design and Implementation of Practical Bidirectional Texture Function Measurement Devices Focusing on the Developments at the University of Bonn*," published in 2014 in *Sensors* magazine, volume 14, issue 5, pp 7753-7819. As after the replacement of LEDs by cameras the number of cameras in the device and the control units for the cameras would be rather high, it would require rather a rigid construction, increasing the weight of such a device substantially. As a result the weight of the device would be high that will be restrictive for an easy manipulation of the device during the adjustment of the device against the stationary sample. More importantly, for the measurement of the stationary sample the number of combinations of illumination directions and acquisition of a stationary sample is then fixed and limited, unlike our invention, as it is simply the number of illumination directions times the number of acquisition directions. Last but not least, in addition to the weight also the price of such a device would be rather high, unlike our proposed invention.

SUMMARY OF THE INVENTION

The solution according to the submitted invention removes the insufficiencies of the slow collection of data or the collection of data with a small number of combinations of illumination and acquisition directions. It concerns a portable instrument for the measurement of an object's geometry and its bidirectional texture function, in which a basic dome-like three-dimensional structure having at least one concave wall concavely curved on the side facing the sample is placed over the measured surface of a stationary sample. This concave wall is equipped with the first illumination units for illuminating the sample and at least one opening goes through it, intersecting a basic dome-like three-dimensional structure. The instrument also contains an acquisition system containing at least one camera or detector. The essence of the device is that it also includes a frame and attached to this frame is the first motor for a rotary drive of the basic dome-like three-dimensional structure. The basic dome-like three-dimensional structure is connected to the rotating part with an axis of rotation, where this rotating part is either directly a shaft of the first motor or is connected to the shaft of the first motor by means of other parts. The axis of rotation of the rotating part goes through at least one opening in the concave wall of the basic dome-like three-dimensional structure or directly through the concave wall of the basic dome-like three-dimensional structure. It is also important that at least one first arm, which carries a set of at least two optical elements mediating the imaging onto the acquisition system, is attached to the basic dome-like three-dimensional structure or to other parts mechanically connected to it. This first arm is mechanically connected to at least one second motor attached to the basic dome-like three-dimensional structure or to other parts mechanically connected to it for the independent driving of the movement of the first arm with respect to a reference coordinate system connected to the basic dome-like three-dimensional structure.

An advantage is when the optical elements mediating the imaging onto the acquisition system borne by the first arm contain lenses and/or a mirror and/or imaging bundles and/or optical prisms.

An advantage is when the first arm also carries at least two second illumination units for illuminating the sample and/or at least two exit apertures of the first illuminating light guiding systems.

It is also an advantage when the concave wall is equipped with exit apertures of one or more second illuminating light guiding systems, while these second illuminating light guiding systems are connected to the fourth illumination units for illuminating the sample and/or the concave wall is equipped with one or more illumination units for illuminating the sample.

It is also an advantage when the first arm also carries at least two cameras and/or at least two detectors.

In another possible version, at least one second arm carrying a set of at least two third illumination units for illuminating the sample is connected to the basic dome-like three-dimensional structure or a part affixed to it. This second arm is mechanically connected to at least one third motor connected to the basic dome-like three-dimensional structure or to other parts affixed to it for the independent movement of the second arm in relation to the reference coordinate system connected to the basic dome-like three-dimensional structure.

In another preferred embodiment at least one third arm, carrying a set of at least two mutually-separated acquisition elements, where these acquisition elements contain at least one detector and/or at least one camera, is connected to the basic dome-like three-dimensional structure or a part that is mechanically affixed to it. This third arm is mechanically connected to at least one fourth motor attached to the basic dome-like three-dimensional structure or to other parts mechanically affixed to it for the independent movement of the third arm in relation to the reference coordinate system connected to the basic dome-like three-dimensional structure.

The first illumination units for illuminating the sample and/or the fourth illumination units for illuminating the sample are beneficially connected electrically, individually and/or in groups, with the control unit for individual and/or group control of these first and/or fourth illumination units. The cameras and/or detectors are also connected to this control unit for the synchronisation of the illumination with the acquisition of the reflected light.

The second illumination units for illuminating the sample are also beneficially connected electrically, individually and/or in groups, with the control unit for individual and/or group control of these second illumination units.

In another beneficial version the third illumination units for illuminating the sample are connected electrically, individually and/or in groups, with the control unit for individual and/or group control of these third illumination units.

It is an advantage when the first motor and the second motor are electrically connected to the control unit for the synchronisation of the illumination and the acquisition of the light reflected from the sample with the movement of the basic dome-like three-dimensional structure and with the movement of the first arm.

It is an advantage when the third motor is electrically connected to the control unit for the synchronisation of the illumination and the acquisition of the light reflected from the sample with the movement of the basic dome-like three-dimensional structure and with the movement of the second arm.

The version in which the fourth motor is electrically connected to the control unit for the synchronisation of the illumination and the acquisition of the light reflected from the sample with the movement of the basic dome-like three-dimensional structure and with the movement of the third arm is also beneficial.

A considerable advantage of the present solution is that it provides a device that is portable, enables on-site measurements, and significantly shortens the time necessary for acquiring a sufficient number of images for various directions of the sample illumination and data acquisition. Because of the combinations of directions of illumination and data acquisition in the device, which are possible due to the multiple illumination units, detectors or cameras and elements mediating the acquisition, and because of the possibilities of their controlled movement in chosen directions and ranges of movements, it is possible to shorten the measurement time for the recording of a given number of combinations of directions of illumination of the sample and of data acquisition from it and/or to achieve unlimited combinations of illumination and acquisition directions. This is achieved thanks to the presence of arms connected to the basic dome-like three-dimensional structure or to other parts of the device affixed mechanically to it, where this object carries the apertures of the second illuminating light guiding systems or the first illumination units and where these arms also perform independent movement or movements in relation to the basic dome-like three-dimensional structure, and they carry elements mediating the acquisition and/or detectors and/or cameras and/or other illumination units. Thus it is possible to obtain an arbitrary combination (theoretically an infinite number of mutually different acquired images) of directions of illumination of the sample and data acquisition from the sample, even for small-sized devices.

The placement of a suitable optical system or its part on the first moving arm is of great importance for the submitted invention. This optical system can also implement imaging on cameras and detectors located apart from the moving arm. This optical system also contains at least one type of element mediating the imaging onto the acquisition system selected from the group (imaging bundles, mirrors, lenses, prisms). At the same time the second illumination units and/or exit apertures of the first illuminating light guiding systems are optionally located on the moving arms. That makes it possible to implement far smaller sizes of the basic dome-like three-dimensional structure which are not limited by the physical dimensions of the cameras or detectors, since they are advantageously located apart from the moving arms, and/or to increase the number of combinations of directions of illumination and acquisition recorded at a single instant, thanks to the use of multiple apertures of the elements mediating the imaging onto the acquisition system on the first arm, where these elements have smaller physical dimensions than the real dimensions of the detectors or cameras. Plus it is possible to place other second illumination units on another moving arm, thereby once again increasing the number of combinations of illumination directions above the value given by the placement of the illumination units on the basic dome-like three-dimensional structure.

BRIEF DESCRIPTION OF THE DRAWINGS

Examples of the implementation of the device are given in the enclosed diagrams.

Figure 1:
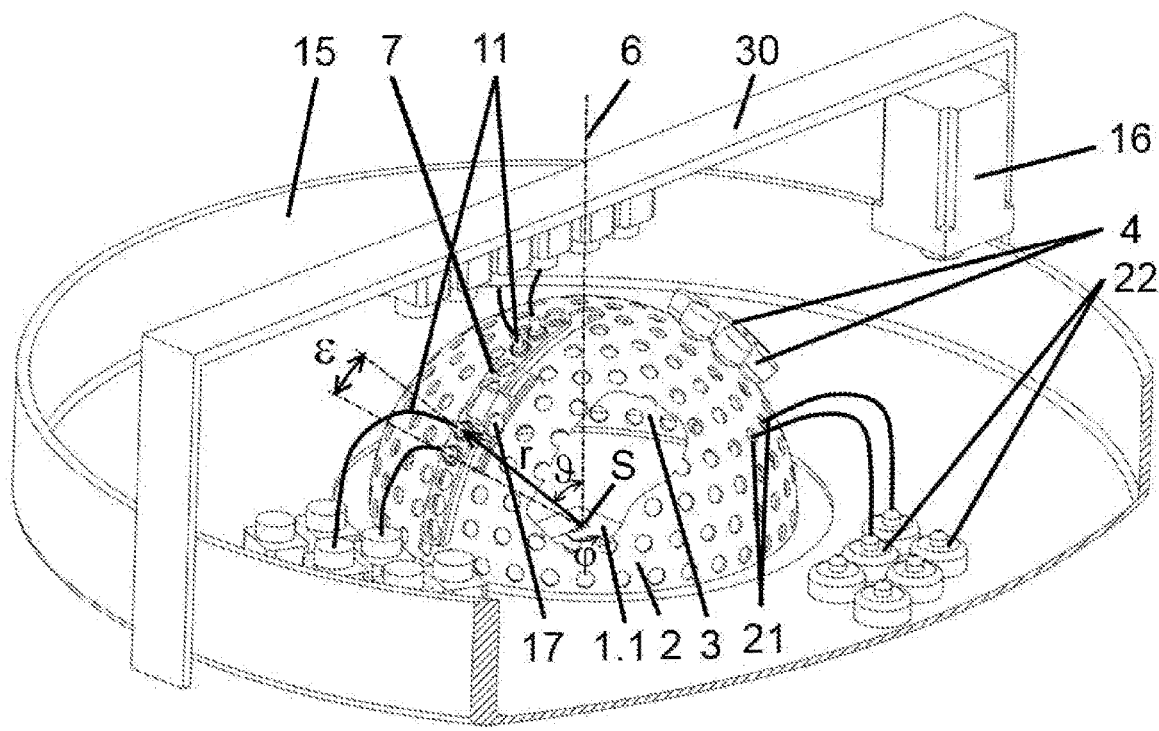
In FIG. 1 the diagram of a miniature embodiment of a portable device for very small samples is depicted.

For clarity, in some of the diagrams the reference numbers do not indicate all the elements of the same type, because there are often too many of these elements.

DETAILED DESCRIPTION OF PREFERRED EMBODIMENTS

The preferred embodiments described below are only some of the many embodiments that fall under the protection of the invention and illustrate the invention idea. They are only selected suitable arrangements, which do not limit the scope of the protection of the invention.

The essence of the submitted solution is a portable device shortening the time required for acquiring a sufficient number of images with combinations of directions of illumination and acquisition through multiplication of sources and detectors of illumination with the possibility of achieving an unlimited number of combinations of directions of illumination of the sample and data acquisition from the sample. This is achieved by the movement of individual parts of the device, specifically the basic dome-like three-dimensional structure 2 equipped with exit apertures of the second light guiding systems 21 and/or the first illumination units 4, as well as with other possible elements, where this basic dome-like three-dimensional structure 2 performs a rotational movement, and by the movement of the arms 7, 8 and 13 carrying optical elements 11 mediating the imaging onto the acquisition system, the second illumination units 9, the exit apertures of the first illuminating light guiding systems, the third illumination units 12 or also cameras or detectors, where these arms are attached directly or through other parts to the basic dome-like three-dimensional structure 2 and perform a further independent movement or combination of movements in relation to this object. The basic dome-like three-dimensional structure 2 is located over the measured surface 1.1 of the sample 1.

A more detailed description of the mountings on the arms 7, 8 and 13 and the elements related to them is given in the following text.

For reasons of brevity, where suitable, the optical elements 11 mediating the imaging onto the acquisition system, the second illumination units 9, the exit apertures of the first illuminating light guiding systems, the third illumination units 12 and the cameras or detectors located on the individual arms will be referred to as the elements located on the arms. The minimal necessary range of movement of each of the arms 7, 8 and 13, which already enables the achievement of the maximum directional resolution of the illumination of the sample and data acquisition from the sample, is relatively small, which is a great advantage from the perspective of the construction of the device. For example, in an arrangement where the elements on the arms are arranged linearly in a single row, the sufficient minimum range of movement of each of the arms 7, 8 and 13 corresponds to the mutual distance of two neighbouring elements located on the given arm in the direction of the given independent movement. This makes it possible to achieve any mutual combination of the directions of illumination of the sample and data acquisition from the sample, i.e. theoretically an infinite number of mutually different image records. The arrangement of the elements on arms 7, 8 and 13 could also be irregular and/or with multiple rows, as will be shown, for example, in FIG. 5b. The principle, however, remains the same; the range of the movement of the arms 7, 8 and 13 for achieving the maximum directional differentiation for irregular arrangements on the arms must at least be such that, when moving between one and the other extreme positions, the arm must be moved by at least the distance corresponding to the medium distance of the centers of the apertures of the elements located on the arm in the direction of this movement.

The basic dome-like three-dimensional structure 2 performing the rotational movement has at least one concave wall 3, which faces the measured surface 1.1 of the sample 1 during the operation of the device. The basic dome-like three-dimensional structure 2 commonly has the approximate shape of a hemisphere or its part, though for the functionality of the device this particular shape is not a condition. The basic dome-like three-dimensional structure 2 rotates around an axis 6, which passes either through at least one opening in the concave wall 3 of the basic dome-like three-dimensional structure 2 or directly through the wall 3 of the basic dome-like three-dimensional structure 2. In one preferred embodiment, the dome-like three-dimensional structure 2 is rotationally symmetric and the axis 6 of its rotation is the same as the axis of its rotational symmetry. If the sample 1 is predominantly planar, the axis 6 is also usually perpendicular to the measured surface 1.1 of the sample 1.

At least one first arm 7 carrying at least two, though preferably more elements 11 mediating the imaging onto the acquisition system, is attached to the basic dome-like three-dimensional structure 2 or to the parts that are mechanically connected to this object. The acquisition system is represented by at least one camera and/or at least one detector. The elements of the acquisition system can be located on the arm 7 or also on other parts of the device, for example on the parts affixed to the moving basic object 2 or also on the basic frame 30, where the optical elements 11 intermediate the transfer of the image of the measured surface on the sensitive surface of the camera/detector. Mirrors, lenses, imaging bundles or prisms can be affixed to the first arm 7 as optical elements 11 mediating the imaging onto the acquisition system and the second illumination units 9 and/or exit apertures of the first illuminating light guiding system can also be placed on the arm 7. There can be only one type of optical element 11 mediating the imaging onto the acquisition system on the first arm 7, or there can also be a combination of various types of these elements. Thus there can be, for example, only the same second illumination units 9 or, in another version, a combination of mirrors and lenses, or a combination of both or even a combination of others. The lenses located on the first arm 7 can, for example, project the measured surface 1.1 of the sample 1 onto the imaging bundles or create a collimated bundle for another part of the optical imaging system. In addition to optical elements 11 mediating the imaging onto the acquisition system, cameras or detectors can also be on the first arm 7, which can simplify the optomechanical construction of the entire device.

The fourth illumination units 22 can also be located on the other parts affixed to the moving basic object 2 or also on the basic frame 30, where the bundle of light from such located illumination units is led to the concave wall 3 using the second illuminating light guiding system 21, which can be a suitable optical system or bundle optics. This arrangement is suitable because it offers a higher number of directions of illumination of the sample with the smaller dimensions of the exit aperture of the second illuminating light guiding system 21. The number of these second illuminating light guiding systems 21 and the number of the first illumination units 4 is such that in mutual cooperation a sufficient illumination of the sample from a sufficient number of directions is ensured. There can be a version of the invention where there will only be exit apertures of the light guiding systems 21, only the first illumination units 4, or a combination of these two elements on the concave wall 3.

In one preferred embodiment, at least one second arm 8 carrying at least two third illumination units 12, though it is better to have more of these illumination units 12, is also attached to the basic dome-like three-dimensional structure 2 or to the parts that are mechanically affixed to this object.

In another preferred embodiment the source of the illumination of the first illumination units 4, second illumination units 9, third illumination units 12 and fourth illumination units 22 are light-emitting diodes (LEDs), or they can be comprised of multiple LEDs and suitable illuminating light guiding systems.

In yet another preferred embodiment at least one third arm 13 carrying at least two acquisition elements 14, though it is better to have more of these acquisition elements 14, is connected to the dome-like three-dimensional structure 2, or to the parts that are mechanically affixed to this object, where the acquisition elements 14 consist of detectors and/or cameras.

One or more arms of the type of the first arm 7 can be present in the device, whereupon these arms can carry various types of optical elements 11 mediating the imaging onto the acquisition system. There can be one or more types of second arms 8 and third arms 13 in the device. The limiting factor for the numbers of individual arms is the design of the shape, arrangement and control of the current position of the individual arms so that they do not collide with one another within the space of the device.

The shape of the concave wall 3 of the basic dome-like three-dimensional structure 2 to which the first illumination units 4 or exit apertures of the second light guiding systems 21 are connected is most frequently close to a part of a spherical surface. The shape of the other parts of the basic dome-like three-dimensional structure 2 can be of any, mostly symmetric, shape given by the method of attaching the basic dome-like three-dimensional structure 2 to the other parts of the device. In our specific case the basic dome-like three-dimensional structure 2 has the approximate shape of a bowler hat. It is advantageous when the basic dome-like three-dimensional structure 2, and thus the concave wall 3 as well, is equipped with openings that can be used for the first illumination units 4, the exits of the second illuminating light guiding systems 21 and any other elements affixed to the dome-like three-dimensional structure 2 to be inserted and mounted. It is not necessary, however, as all of these elements can be attached directly to the concave wall 3 from the inside.

The first arm 7, second arm 8 and the third arm 13 most frequently have a rounded shape, approximating the shape of the basic dome-like three-dimensional structure 2 with a slight indentation, while the surface of these arms facing the basic dome-like three-dimensional structure 2 is considerably smaller than the surface of the basic dome-like three-dimensional structure 2. If the basic dome-like three-dimensional structure 2 has the shape of part of a hemisphere and the axis 6 of rotation is, in an advantageous version, identical to the axis of the rotational symmetry of this hemisphere, it is an advantage for the arms to have the approximate shape of curves with the longitudinal axis lying in one of the meridional planes, where the meridional planes, for the purpose of this text, are the planes in which the axis 6 of rotation lies. The radius of the surface of these arms is larger than the radius of the curvature of the basic dome-like three-dimensional structure 2, if the arms 7, 8, 13 are outside of the basic dome-like three-dimensional structure 2, or smaller, if the arms 7, 8, 13 are inside the basic dome-like three-dimensional structure 2. In the direction of the radius vector r in the coordinates displayed in FIG. 1 the arms can have a simple rectangular profile, but for increasing the rigidity of the arm it is best to use a better reinforced shape, such as L, U or C profile, for example, or a thin-walled hollow profile. In the direction perpendicular to the axis 6 the arms can have a constant profile width along its entire length, as is indicated in the example of the arm in FIG. 5a, or its width can vary, usually increasing in the direction away from the axis 6, as is indicated in the example of the arm in FIG. 5b.

The optical elements 11 mediating the imaging onto the acquisition system, second illumination units 9, exit apertures of the first illuminating light guiding system, the third illumination units 12 and acquisition elements 14 can be arranged on the arms in individual rows in a longitudinal direction, i.e. in the meridional planes, or also in multiple rows corresponding to the various lines, whose distances are regular in the best case, though it is also possible to arrange them irregularly in both direction and distance.

With regard to the first movement, which is the aforementioned rotation of the basic dome-like three-dimensional structure 2 around the axis 6 of rotation, the movements of the arms 7 and/or 8 and/or 13 towards the reference coordinate system connected to the basic dome-like three-dimensional structure 2 are added.

In an advantageous version, where the basic dome-like three-dimensional structure 2 has the approximate shape of a hemisphere, the movement of the arms 7, 8, 13 is such that their longitudinal axis makes a general movement in the meridional plane of the dome-like three-dimensional structure 2.

In one of the suitable applications, which is depicted in FIG. 1, at least two optical elements 11 mediating the imaging onto the acquisition system are on the first arm 7, while these optical elements can be any of the elements from the group (lenses, mirrors or prism parts of a periscope system or imaging bundles), or second illumination units 9 and/or exit apertures of the first light guiding systems. The specific types of optical elements 11 are not depicted in detail in the diagram. The openings for the mounting of the elements 11 have a mutual angular distance of $\varepsilon$. The elements 11 mediating the imaging onto the acquisition system simultaneously observe the sample under different zenith angles $\vartheta$. The sample is illuminated by one or more of the first illumination units 4 or second illumination units 9 or third illumination units 12 or one or more exit apertures of the first illuminating light guiding systems or the second illuminating light guiding systems 21 in the pre-configured directions of illumination. In comparison with the situation where the first illumination units 4 or exit apertures of the second illuminating light guiding systems 21 are affixed to the rotating basic dome-like three-dimensional structure 2, which makes it possible to obtain only a finite number of discrete values of combinations of illumination and acquisition directions $\vartheta,\varphi$ of the sample 1, the placement of optical elements 11 mediating the imaging onto the acquisition system onto the first movable arm 7, which performs an independent movement in relation to the basic dome-like three-dimensional structure 2, thanks to the combination of the movement of the arm 7 and the basic dome-like three-dimensional structure 2, supplements the originally fixed number of discrete values of the combinations of the directions of the sample illumination and data acquisition by any other angle combination, thereby increasing the directional resolution—it is possible to decrease the value of the angles $\vartheta n-\vartheta m$ and $\varphi n-\varphi m$ between the closest positions of the angles $\vartheta n$, $\varphi n$ and $\vartheta m$, $\varphi m$ of the measured data to an arbitrarily small value. The same principle can also be used in the case of illumination units 4 or exit apertures of the second illuminating light guiding systems 21. The placement of other sources of light, such as the second illumination units 9 or the exit apertures of the first illuminating light guiding systems on the first arm 7, or the third illumination units 12 on the second arm 8, where the arms 7, 8 perform an independent linear or circular movement against the basic dome-like three-dimensional structure 2, makes it possible to extend the discrete number of values of combinations of the directions of the illumination of the sample with any other angular combination, thereby increasing the directional resolution of the acquired data. To achieve any angular combinations of $\vartheta$ and $\varphi$, it is not necessary to implement the range of the movement of the individual arms in the entire space of the basic dome-like three-dimensional structure 2, but it is enough to implement them within the range of the angular distances $\varepsilon$ between the individual optical elements 11 mediating the imaging onto the acquisition system or the analogous angular distances between the individual illumination units 12.

Figure 6:
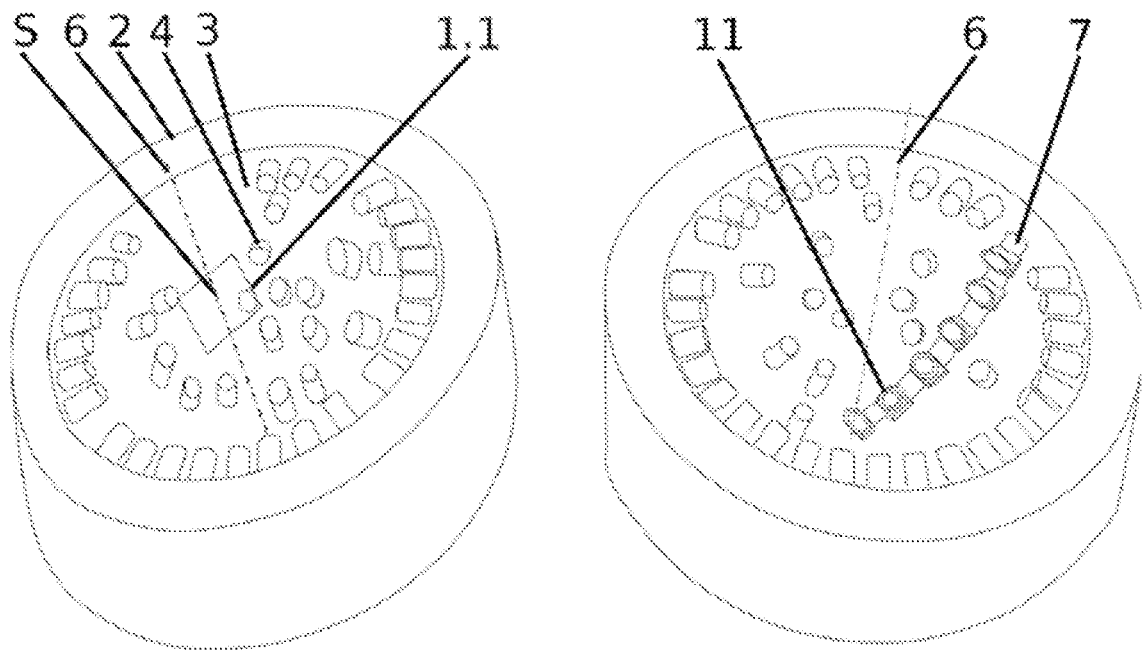
FIG. 6 is a photograph of an implemented device, where the actual elements corresponding to the reference signs of the schematic diagrams are shown.

The controlled basic dome-like three-dimensional structure rotates around the axis 6 above the surface 1.1 of the measured sample 1, while the central part of the measured surface 1.1 is located in position S, which can be seen, for example, in FIG. 6. The elements 11 mediating the imaging onto the acquisition system are, in the case that we will now describe, implemented using mirrors reflecting the illumination from the sample to the other part of the optical system and also to the cameras and/or detectors located outside of the first arm 7. Using combinations of the controlled movement of the basic dome-like three-dimensional structure 2 around the axis 6 and the movement of the first arm 7, it is possible to obtain a record of the surface 1.1 of the sample 1 from any direction of data acquisition of the sample 1.

Alternatively, it is possible also to implement a second arm 8, which moves in a similar manner and is used to achieve other directions of the sample illumination. The individual arms 7, 8, 13 can perform various types of movements.

Figure 3:
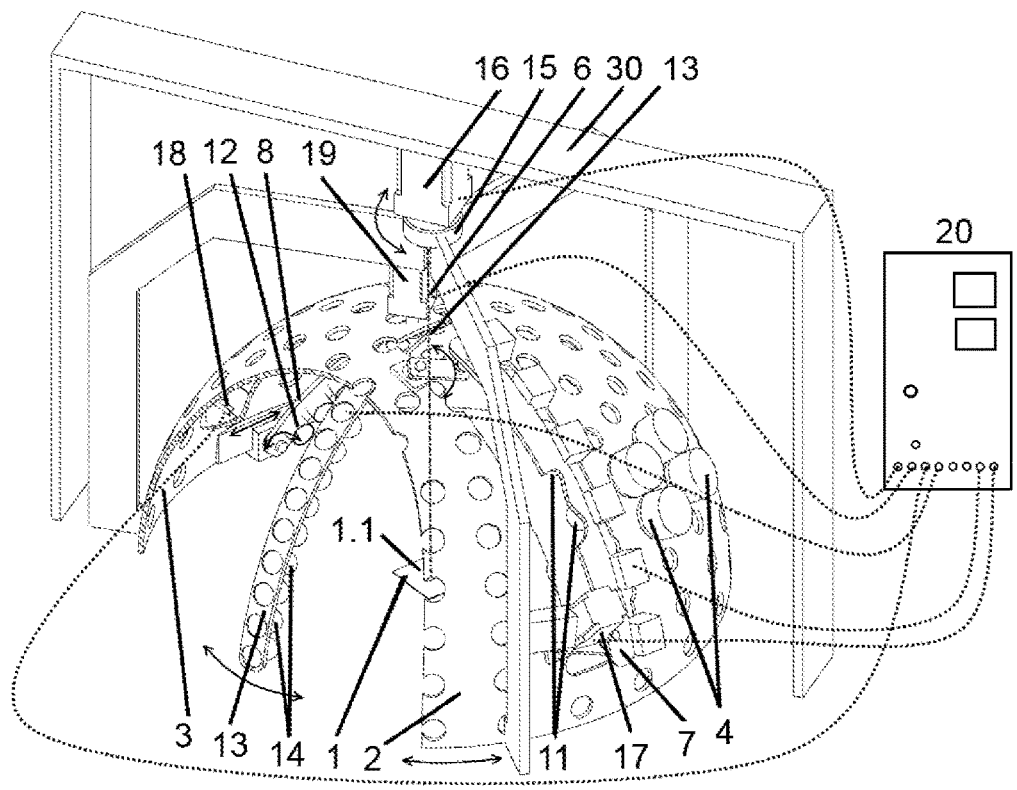
FIG. 3 is an example of a device for a larger measurement area of the sample with larger distances of exit apertures of the elements mediating the imaging onto the acquisition system and also the apertures of the cameras and/or detectors from the middle of the sample.

A specific example of the device, using the essence of the invention (i.e. two independent movements on the part of the optical elements 11 mediating imaging on the acquisition system, where one movement is realised by the basic dome-like three-dimensional structure 2 in the shape of a partial hemisphere and the second movement by the first arm 7 moving along a circular, straight-line or more complicated trajectory), is schematically depicted in FIG. 3. An example of possible movement is indicated for the first arm 7, for the second arm 8 and for the third arm 13. In order to achieve any combination of directions of data acquisition from the sample 1, for the given combination of angles $\vartheta$ and $\varphi$ in the chosen range of motion, the device must enable the setting of the position of at least one of the optical elements 11 mediating the imaging onto the acquisition system to the position of the given combination of angles $\vartheta$ and $\varphi$. The range of the movement of the setting of the direction of data acquisition from the surface 1.1 of the sample 1 in the direction of angle $\varphi$ is from 0 to $2\pi$ and it is possible to achieve any values of this angle. In order to achieve any combination of data acquisition from the sample 1 in the direction of angle $\vartheta$ within the range of angles $0$-$\vartheta_{max}$, the range of the movement of any movement of the arm 7 in the direction of angle $\vartheta$ will be equal to at least the angular distance $\varepsilon$ between two neighbouring optical elements 11 mediating the imaging onto the acquisition system, measured in the plane passing through the axis 6. In such a case the two neighbouring optical elements 11 mediating the imaging onto the acquisition system, with the possible use of rotation around the axis 6 in the direction of angle $\vartheta$, will reach the same angular position $\vartheta$ and $\varphi$ towards the sample 1. The range of the movement of the arm 7 can also be smaller.

It is, however, advantageous to achieve redundancy of the setting of the acquisition directions and therefore implement the range of the movement of arm 7 in the direction of the angle $\vartheta$ at least in the range of the angular distance of $\varepsilon$.

The movements realised by the individual arms 7, 8, 13 are usually simple rotational (the circular guide of arm 7 in FIG. 1) or linear movements, or a combination of these generating a general movement of the arm in a plane (the movement of arm 7 in FIG. 3) or in space (the movement of arm 8 in FIG. 3). The movements of the individual arms 7, 8 and 13 are implemented by at least one second motor 17, at least one third motor 18 and at least one fourth motor 19, respectively, controlled by a control unit 20 and synchronised with the control of the first illumination units 4 for illuminating the sample 1, or the second illumination units 9 or third illumination units 12 or fourth illumination units 22 and the acquiring of data from the acquisition elements 14.

In the case of more complicated movements, e.g. the movement of the second arm 8 in FIG. 3, the individual arms 7, 8 and 13 can also be actuated by multiple motors. In FIG. 3 only one of the third motors 18 is visible next to the arm 8, though in actuality two third motors 18 are necessary for the given movement, the second one is not visible in the diagram.

A new combination of the directions of illumination of the sample 1 and the data acquisition from the sample 1 can be obtained through the suitable movement of the second arm 8 in combination with the movement of arm 7 and the movement of the basic dome-like three-dimensional structure 2 around the axis 6. If there are more first arms 7 in the device, then with their use it is possible to get the same set of measured data in a shorter measurement time. If the third arm 13 contains different types of acquisition elements 14 than the common cameras or detectors, then it is possible to get more data about the sample, e.g. the spectral function of the reflectivity of the surface. It can also be a small change, e.g. a different wavelength of the bandpass filter used, where the acquisition system can be the same as in the case of arm 7, though there is a change in the imaging system or in the acquisition system.

In the basic configuration of the device, which is depicted in FIGS. 1, 2, 3 and 4, the axis 6 is perpendicular to the plane approximating the surface of the sample. Thus the device is equipped with a fixed camera not located on the moving arms and always intermediating the view of the sample in the direction of axis 6. This camera, e.g. with the use of an auto-collimating principle, is used for adjusting the entire portable device towards the stationary sample.

Figure 7:
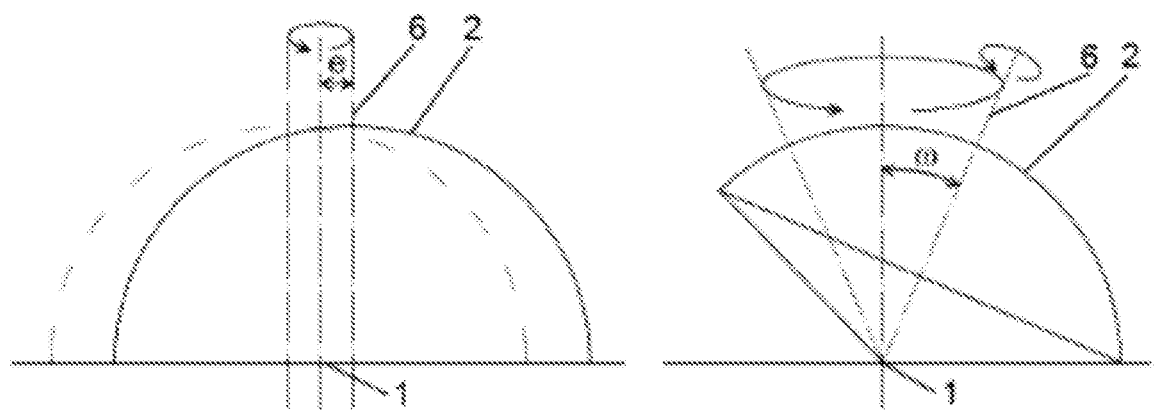
In FIG. 7 two alternative options of configuring the movements of the basic dome-like three-dimensional structure in relation to the sample are shown.

An alternate variation of the device is the configuration from the right side of FIG. 7, where the axis 6 is not perpendicular to the plane of the surface of the sample 1. In such a case the basic dome-like three-dimensional structure 2 will not only perform the rotation around one axis 6, but it will perform a precession movement around two axes, which intersect on the surface of the measured sample 1. The advantage of such a solution is the possibility to decrease the size of the basic dome-like three-dimensional structure 2 from the shape of an approximate hemisphere to the shape of part of the spherical segment given by the angle $\omega$, which forms both of the precessional axes, thereby decreasing the mass of the device while maintaining the possibility of acquiring the data for all the combinations of directions of illumination of the sample 1 and data acquisition from the sample 1.

Another alternate variation of the device is the configuration from the left side of FIG. 7, where the basic dome-like three-dimensional structure 2 does not only rotate around the axis 6, but around two parallel axes, perpendicular to the sample, and thus it performs a planetary movement above the surface of the sample 1. The advantage of this solution is, in addition to the increased number of combinations of illumination and data acquisition directions with regard to the sample 1, the possibility of imaging a larger part of the surface of the sample even in the case of a miniature version of the device with small radii of the curvature of the basic dome-like three-dimensional structure 2. The control unit of the device can be any computer system equipped with the corresponding SW and HW for the imaging of the data from the detectors and cameras, turning the illumination units off and on and implementing the movements of the individual actuators. For practical reasons it is suitable to divide the computer system between a basic industrial computer and several microcomputers controlling the individual functional elements and mutually communicating over a suitable communication protocol. In the prototype of the device we implemented shown in FIG. 6 we used 145 microcomputers in addition to an industrial computer for the control. The measured data from the device is processed during the measurement or in a post-processing regime after the completion of the measurements.

FIG. 1 depicts the sample 1, the basic dome-like three-dimensional structure 2, the concave wall 3 of the object 2 facing the sample 1, the rotating part 15 with the axis of rotation 6, the first motor 16 positioning the basic dome-like three-dimensional structure 2 connected to the device frame 30, and a movable arm 7 with positions for mounting optical elements 11 mediating the imaging onto the acquisition system. These optical elements 11 mediating the imaging onto the acquisition system are usually lenses, or other optical elements, such as imaging bundles, optical elements of a periscopic system, such as mirrors or prisms, which intermediate the imaging on the acquisition system. These are usually cameras or other detectors of illumination, which can be placed on the device frame 30, on the parts mechanically affixed to the basic dome-like three-dimensional structure 2 or also on the moving arms 7, mechanically connected to the second motor 17 and also driven by it. The suitability of the selection of some of these placements depends on the ratio of the size of the basic dome-like three-dimensional structure 2, the angular distance of the centers of the apertures of the elements 11 mediating the imaging onto the acquisition system and the transverse size of the detector. If, with the given size of the basic dome-like three-dimensional structure 2, the required number of apertures of optical elements 11 mediating the imaging onto the acquisition system fit on the arm 7, then a suitable solution is to place the acquisition element on the arm 7. If this condition is not met, then it is suitable to only place the optical elements 11 mediating the imaging onto the acquisition system (e.g. a micro-lens with illuminating bundle optics) on the arm 7 with significantly smaller transverse dimensions and placing the actual detectors/cameras outside of the moving arm 7. The same condition is valid for the first illumination units 4. If the dimensions of the basic dome-like three-dimensional structure 2 do not permit the placement of the first illumination units 4, due to their large transverse dimensions, into the desired small mutual distances right on the basic dome-like three-dimensional structure 2, then a suitable solution is to place the fourth illumination units 22 outside of the basic dome-like three-dimensional structure 2 and to bring only illumination bundles, e.g. using the suitable bundle optics of the second illuminating light guiding system 21, into positions on the concave surface 3. Thus even a small device can obtain a theoretically infinite number of mutually-different images originating from various combinations of directions of illumination of the sample and of data acquisition from the sample.

The motors 17, 18 and 19 are mechanically connected directly or through other parts to the basic dome-like three-dimensional structure 2. Unlike others, the first motor 16 is mechanically connected to the frame 30, either directly or through other parts, so that the basic dome-like three-dimensional structure 2 can turn in relation to this frame 30.

The arms 7, 8 and 13 can also be connected to the basic dome-like three-dimensional structure either directly or through other parts.

For reasons of simplicity, the connection between the rotating part 15 and the basic dome-like three-dimensional structure 2, which can be implemented in many ways, is not depicted in FIG. 1.

Figure 2:
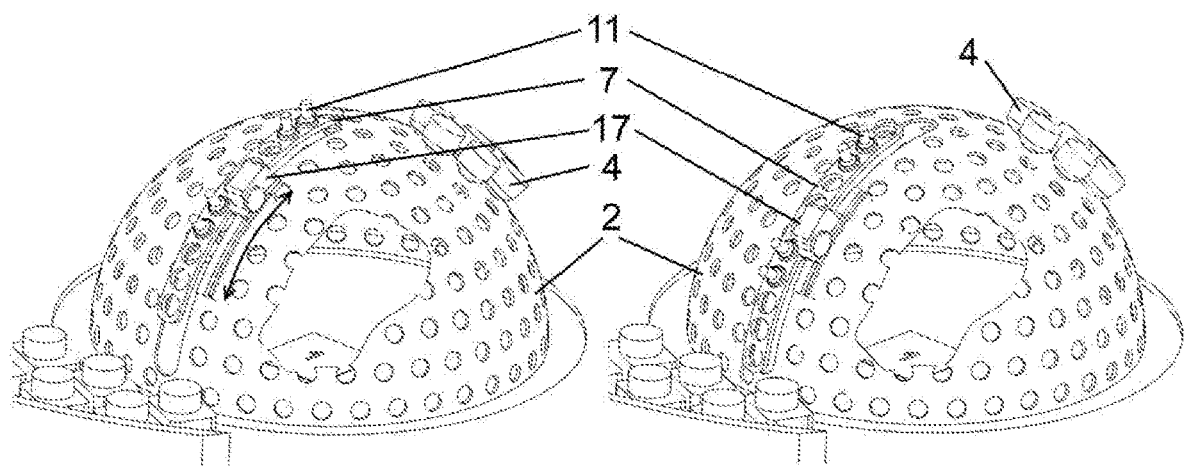
In FIG. 2 the range of the movement of one of the arms is plotted.

FIG. 2 depicts an example of the two extreme positions of the arm 7, where the length of the movement between these two extreme positions is longer than the distances between the centers of the exit apertures of the optical elements 11 mediating the imaging onto the acquisition system in the direction of the arm's movement.

FIG. 3 shows an example of an embodiment of the device with larger distances of the optical elements 11 mediating the imaging onto the acquisition system from the point S on the surface 1.1 of the sample 1. The figure depicts the sample 1, its measured surface 1.1, the basic dome-like three-dimensional structure 2, the concave wall 3 of the basic dome-like three-dimensional structure 2, which is concave in the direction of the sample 1, the rotating part 15 with the axis 6 of rotation. The first motor 16 connected to the device frame 30 turns the basic dome-like three-dimensional structure 2 around the axis 6. The figure also shows the first arm 7, which is movable and the positions for mounting the optical elements 11 mediating the imaging onto the acquisition system can be seen in it. These elements are usually lenses, or other optical elements, such as imaging bundles, optical elements of a periscopic system, such as mirrors or prisms, which intermediate the imaging on the acquisition system. These are usually cameras or other detectors of illumination that, in a limited size of the device, can be placed on the movable arm 7 together with the elements 11 mediating the imaging onto the acquisition system.

This basic configuration can be supplemented by a second arm 8 with positions for the placement of third illumination units 12. The arm is mechanically connected to the third motor 18, which drives it. With the suitable positioning of this arm 8 in combination with the positioning of the arm 7 and the positioning around the axis 6, it is possible to obtain new combinations of directions of illumination of the sample 1 and of data acquisition from the sample 1. Furthermore the basic configuration can be supplemented by a third arm 13 with acquisition elements 14. This arm is mechanically connected either directly or through other parts to the fourth motor 19, which positions it. With the suitable positioning of this third arm 13 in combination with the positioning of the arms 7 and 8 and the positioning around the axis 6, it is possible to obtain new combinations of directions of illumination of the sample 1 and of data acquisition from the sample.

Figure 4:
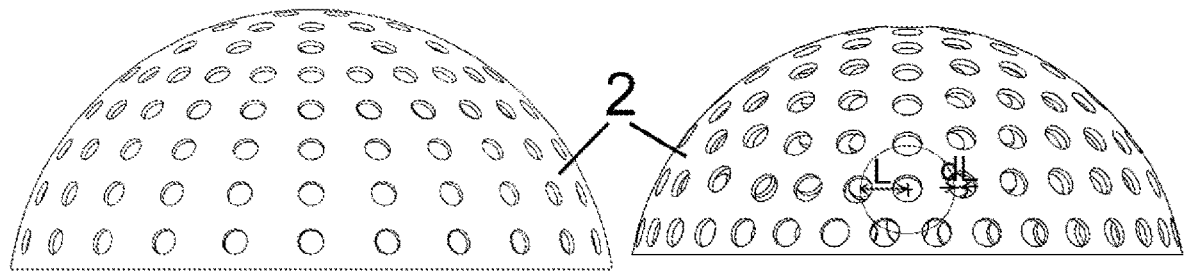
FIG. 4 is an example of the distribution of the first illumination units in a regular grid of apertures of the individual elements leading to the variable density of the apertures over the area of the basic dome-like three-dimensional structure.

The attachment of the motors 16, 17, 18, 19 and the arms 7, 8, 13 in FIG. 3 is analogous to what is described in FIG. 1. The left part of FIG. 4 shows the distribution of the first illumination units 4 in a regular grid of apertures of the individual elements leading to a variable density of the apertures over the surface of the basic dome-like three-dimensional structure 2. An example of the distribution of the first illumination units 4 with irregular distances of the apertures L±dL of the individual elements leading to an almost constant planar density of the apertures on the surface of the basic dome-like three-dimensional structure 2 is seen in the right part of FIG. 4. The irregular distribution of the elements is best used for the suppression of the interference between the grid of elements, e.g. the first illumination units 4, and the grid of positions for data measurement.

Figure 5:
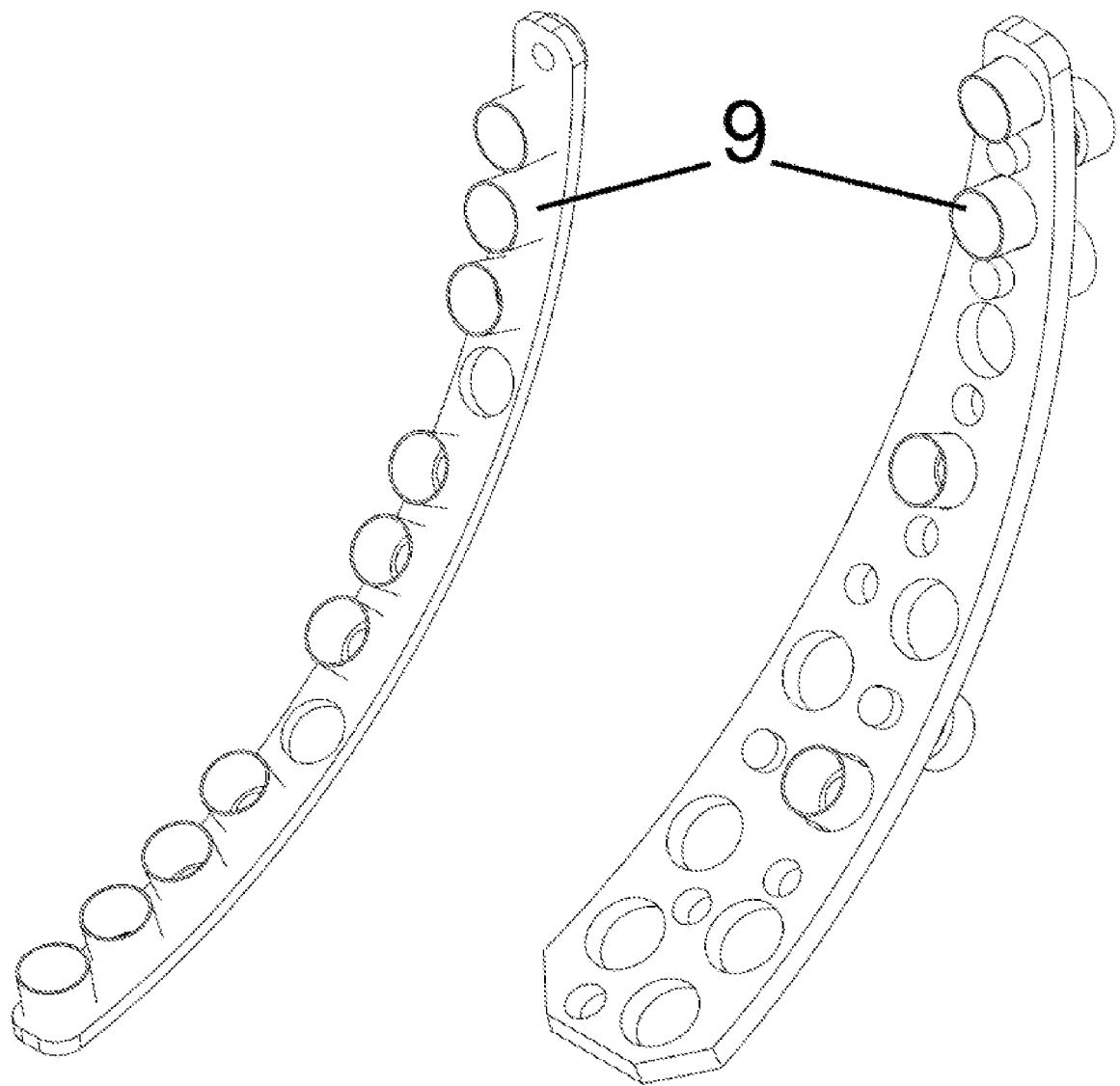
FIG. 5 shows one arm with regular distances of the apertures of the individual elements on the arm and one arm with irregular distances of the apertures of the individual elements.

The left side of image 5 shows a typical implementation of an arm, which can be used for any of the arms (7, 8, 13), with regular distances of positions of the apertures of the individual optical elements 11 mediating the imaging onto the acquisition system, the second illumination units 9 or the exit apertures of the first illuminating light guiding system on the arm. The right side of FIG. 5 shows an example of another typical arm that can be used for any of the arms (7, 8, 13) with the irregular distances of the apertures of the individual optical elements 11 mediating the imaging onto the acquisition system of the second illumination units 9 or the exit apertures of the first illuminating light guiding systems. An advantage of the regular placement of the apertures along the arm is the simple manufacturing and implementation of the measurements. A disadvantage is the lower density of measured data for larger values of the angle ϑ from the axis of rotation 6, as can be seen on the left side of FIG. 4. This fact can be compensated for by the placement of a large number of apertures of the elements at a larger angle ϑ, as can be seen in the example of the arm with an uneven arrangement of the apertures. In the right side of FIG. 5 there is an example of the current placement of the apertures of the second illumination units 9 on the movable arm, together with the apertures of the optical elements 11 mediating the imaging onto the acquisition system. Visible apertures represent free positions for the placement of second illumination units 9, or the exit apertures of the first illuminating light guiding systems. This placement is suitable if the arm is connected to the basic dome-like three-dimensional structure 2 from the outside. Then there must be a longitudinal slit in the basic dome-like three-dimensional structure 2 along the axis of the arm, and the first illumination units 4 cannot be located in the area of this opening. If the arm is affixed from the inside of the basic dome-like three-dimensional structure 2, as can be seen in the example of the second arm 8 in FIG. 3, then this arm covers a part of the first illumination units 4. The first arm 7 can also have a similar placement as the second arm 8 in FIG. 3. In both cases of the placement of the first arm 7, the measurements of the sample during its illumination from the directions in the vicinity of the apertures of the elements 11 mediating the imaging onto the acquisition system would be missing in the data, because the first illumination units 4 would be absent in these directions. Thus it is suitable also to place the second illumination units 9, or at least the exit apertures of their bundles from the second illuminating light guiding system 21, on the first arm 7.

FIG. 6 is a photograph of an implemented device, where the actual elements corresponding to the reference numbers on the schematic diagrams are shown. The basic dome-like three-dimensional structure 2, and its concave wall 3, concavely curved facing the sample 1, the first illumination units 4, the axis of rotation 6, the first arm 7, the elements 11 mediating the imaging onto the acquisition system, S—the axis 6 of rotation's point of intersection with the expected surface 1.1 of the sample 1.

FIG. 7 depicts two alternative variations of arranging the movements of the basic dome-like three-dimensional structure 2 towards the sample 1, where the basic dome-like three-dimensional structure 2 performs a composite movement. On the left side of the figure there is an example of a planetary movement of the basic dome-like three-dimensional structure 2, where there is not only rotation around the axis 6 perpendicular to the sample 1, but this axis also turns around another axis parallel to the axis 6 at the distance e. On the right side of the figure there is an example of a precession movement of the basic dome-like three-dimensional structure 2, where there is not only rotation around the axis 6, but this also turns around another axis, which forms an angle ω with it, and their point of intersection is found on the surface of the sample 1.

The device according to the submitted proposal can be implemented with a mass and dimensions that make possible its easy portability and its use on-site and in the field. Two of the implemented variants have exit apertures of the optical elements 11 mediating the imaging onto the acquisition system located, in the first case, at a distance of about 250 mm from the center of sample 1 and, in the second case, at a distance of 160 mm from the center of the sample. These variants have been implemented in the versions pursuant to FIG. 3. When the apertures of the optical elements mediating the imaging onto the acquisition system 11 are at a distance of 100 mm or less, the variant according to FIG. 1 is used. The largest of the specified variants has a total weight of about 12 kg; for the smaller variant the weight is significantly less.

INDUSTRIAL APPLICABILITY

A portable device using the presented principle for obtaining intermediate positions between angle combinations of directions of illumination of the sample and of data acquisition from the sample using mutually affixed illumination units or detectors has industrial applicability as an imaging device for the application of computer graphics in the framework of 3D modelling and the presentation of objects, the quality control of a surface replacing visual examinations for monitoring surfaces at various directions of illumination and monitoring and in other areas where the aforementioned characteristics can be used, i.e. where it is necessary to characterise and preserve the appearance of a material, for example in the area of preserving cultural heritage artefacts. The main advantage of the present inventive solution compared to other existing methods for obtaining BTF data from a stationary measured sample is the shortened time for the acquisition of the required number of combinations of the directions of illumination of the sample and of data acquisition from the sample, by multiplication of directions of illumination and directions of acquisition of the light reflected from the sample and, mainly, the possibility of the implementing of a portable measurement device for the acquisition of the appearance of the surface of a sample, enabling on-site measurement of the sample.

Uses for the given approach can be found in the fields of computer graphics, optical records and the reconstruction of data of various types of samples, where it is possible to apply the representation of a real object in 3D virtual reality, including, for example, archaeology, biology, the arts, 3D TV, the evaluation of the quality of a surface and its modification, the detection and classification of a material in computer vision, and in other applications.

REFERENCE SIGNS LIST

1—sample
1.1—surface of the sample
2—basic dome-like three-dimensional structure
3—concave wall (of the basic dome-like three-dimensional structure 2 concavely curved on the side facing the sample 1)
4—first illumination units
6—axis of rotation (of the rotating part 15 and of the basic dome-like three-dimensional structure 2)
7—first arm
8—second arm
9—second illumination units
11—optical elements mediating the imaging onto the acquisition system
12—third illumination units
13—third arm
14—acquisition elements
15—rotating part
16—first motor
17—second motor
18—third motor
19—fourth motor
20—control unit 21—second illuminating light guiding system
22—fourth illumination units
30—frame

The invention claimed is:

1. A device for measuring the geometry of a sample and the spatially varying surface reflectance of the sample surface, in which a basic dome-like three-dimensional structure is placed over the surface of the sample to be measured, wherein the basic dome-like three-dimensional structure has at least one concave wall concavely curved on the side facing the sample, the device further comprises at least two illumination units whose outputs direct light via respective apertures onto the sample surface to be measured, the apertures being rigidly or movably connected to the dome-like three-dimensional structure, and an optical acquisition system including at least two devices selected from the group consisting of cameras and optical detectors,
  wherein the sample is in a stationary position and the device further comprises a frame and a first motor for rotationally driving the basic dome-like three-dimensional structure, the motor being attached to the frame, wherein the basic dome-like three-dimensional structure is mechanically connected to a rotating part having an axis of rotation,
  wherein the rotating part is the shaft of the first motor oriented in such way that its axis of rotation passes through the concave wall of the basic dome-like three-dimensional structure or through an opening created in the concave wall or wherein the rotating part is an element connected to the shaft of the first motor by means of motion transmission means and the orientation of the shaft of the first motor and the motion transmission means are such that the axis of rotation of the rotating part passes through the concave wall of the basic dome-like three-dimensional structure or through an opening created in the concave wall, and
  wherein at least one first arm, which carries a set of at least two optical elements mediating the imaging onto the acquisition system,
  the optical elements consisting of mirrors and/or lenses and/or imaging bundles and/or prisms, is attached to the basic dome-like three-dimensional structure or to other parts mechanically fixed to the basic dome-like three-dimensional structure
  so that the first arm can rotate together with the basic dome-like three-dimensional structure, wherein this first arm is also mechanically connected to at least one second motor, the second motor being attached to the basic dome-like three-dimensional structure or to other parts mechanically fixed to the basic dome-like three-dimensional structure for independently driving the movement of the first arm with respect to a reference coordinate system associated with the basic dome-like three-dimensional structure.

2. The device according to claim 1, wherein the first arm also carries at least two second illumination units for illuminating the sample and/or at least two exit apertures of a first illuminating light guiding system.

3. The device according to claim 1, wherein the concave wall is equipped with exit apertures of one or more second illuminating light guiding systems, wherein these second illuminating light guiding systems are connected at their inputs to fourth illumination units for illuminating the sample and/or the concave wall is equipped with one or more first illumination units for illuminating the sample.

4. The device according to claim 3, wherein the first illumination units for illuminating the sample and/or the fourth illumination units for illuminating the sample are electrically connected, individually and/or in groups, to a control unit for an individual and/or group control of these first illumination units and/or fourth illumination units, where cameras and/or detectors are simultaneously connected to this control unit for the synchronisation of illumination with the acquisition of reflected light.

5. The device according to claim 1, wherein the first arm also carries at least two cameras and/or at least two detectors.

6. The device according to claim 1, wherein at least one second arm carrying a set of at least two third illumination units for illuminating the sample is attached to the basic dome-like three-dimensional structure or to other parts mechanically connected to it, wherein this second is mechanically connected to at least one third motor, attached to the basic dome-like three-dimensional structure or to other parts mechanically connected to it, for independently driving the movement of the second arm with respect to a reference coordinate system connected to the basic dome-like three-dimensional structure.

7. The device according to claim 1, wherein at least one third arm, carrying a set of at least two mutually separated acquisition elements, wherein these acquisition elements include at least one detector and/or at least one camera, is attached to the basic dome-like three-dimensional structure or to other parts mechanically connected to it, and wherein this third arm is mechanically connected to at least one fourth motor attached to the basic dome-like three-dimensional structure or to other parts mechanically connected to it for independently driving the movement of the third arm with respect to a reference coordinate system connected to the basic dome-like three-dimensional structure.

8. The device according to claim 2, wherein the second illumination units for illuminating the sample are electrically connected, individually and/or in groups, to the control unit for individual and/or group control of these second illumination units.

9. The device according to claim 6, wherein the third illumination units for illuminating the sample are electrically connected, individually and/or in groups, to the control unit for individual and/or group control of these third illumination units.

10. The device according to claim 1, wherein the first motor and the second motor are electrically connected to the control unit for the synchronisation of illumination and acquisition of light reflected from the sample with the movement of the basic dome-like three-dimensional structure and with the movement of the first arm.

11. The device according to claim 6, wherein the third motor is electrically connected to the control unit for the synchronisation of illumination and acquisition of light reflected from the sample with the movement of the basic dome-like three-dimensional structure and with the movement of the second arm.

12. The device according to claim 7, wherein the fourth motor is electrically connected to the control unit for the synchronisation of illumination and acquisition of light reflected from the sample with the movement of the basic dome-like three-dimensional structure and with the movement of the third arm.

* * * * *